(12) United States Patent
Swarnakar

(10) Patent No.: US 8,321,390 B2
(45) Date of Patent: Nov. 27, 2012

(54) METHODS AND APPARATUS FOR ORGANIZING DATA IN A DATABASE

(76) Inventor: Vivek Swarnakar, San Francisco, CA (US)

( * ) Notice: Subject to any disclaimer, the term of this patent is extended or adjusted under 35 U.S.C. 154(b) by 349 days.

(21) Appl. No.: 12/482,930

(22) Filed: Jun. 11, 2009

(65) Prior Publication Data

US 2010/0318498 A1    Dec. 16, 2010

(51) Int. Cl.
*G06F 7/00* (2006.01)

(52) U.S. Cl. .......................... 707/696; 707/791; 707/802

(58) Field of Classification Search .................. 707/600, 707/601, 711, 736, 737, 738, 739, 740, 741, 707/752, 753, 90, 791, 796, 803, 804, 807, 707/810, 953, 960, 961, 962
See application file for complete search history.

(56) References Cited

U.S. PATENT DOCUMENTS

| | | | | |
|---|---|---|---|---|
| 5,819,282 A * | 10/1998 | Hooper et al. | ......................... | 1/1 |
| 6,112,209 A * | 8/2000 | Gusack | ................... | 1/1 |
| 6,208,993 B1 * | 3/2001 | Shadmon | ............................. | 1/1 |
| 6,401,092 B1 | 6/2002 | Donohoe et al. | | |
| 6,460,028 B1 * | 10/2002 | Penoyer | ................. | 1/1 |
| 6,763,358 B2 | 7/2004 | Anderson et al. | | |
| 6,778,996 B2 * | 8/2004 | Roccaforte | ................... | 707/600 |
| 7,024,414 B2 | 4/2006 | Sah et al. | | |
| 7,167,869 B2 | 1/2007 | Wedel et al. | | |
| 7,236,972 B2 * | 6/2007 | Lewak et al. | ......................... | 1/1 |
| 7,249,118 B2 | 7/2007 | Sandler et al. | | |
| 7,536,381 B2 * | 5/2009 | Klein et al. | ........................... | 1/1 |
| 7,765,180 B2 * | 7/2010 | Tamatsu | ................................ | 1/1 |
| 2004/0024790 A1 * | 2/2004 | Everett | .......................... | 707/200 |
| 2004/0236653 A1 * | 11/2004 | Sokolic et al. | .................. | 705/35 |

OTHER PUBLICATIONS

Stonebraker et al., "C-Store: A Column-oriented DBMS", Proceedings of the 31st VLDB Conference, Trondheim Norway, 2005.
Abadi, "Column-Stores for Wide and Sparse Data", Presented at the 3rd Biennial Conference on Innovative Data Systems Research (CIDR), California, USA, Jan. 7-10, 2007.
Abadi et al., "Scalable Semantic Web Data Management Using Vertical Partitioning", Presented at VLDB '07 Conference, Sep. 23-28, 2007, Vienna, Austria, pp. 411-422.

* cited by examiner

*Primary Examiner* — Shahid Alam
*Assistant Examiner* — Evan Aspinwall
(74) *Attorney, Agent, or Firm* — Patrick B. Law (57) ABSTRACT

Disclosed are methods and apparatus for organizing data in a database in a set-oriented manner. Data is organized by linking data in the form of key-value pairs stored in storage media of the database to corresponding key-value pair identifiers. A set having a corresponding set identifier is then associated with one or more of the key-value pair identifiers where the set includes the stored key-value pairs linked to the key-value pair identifiers.

15 Claims, 6 Drawing Sheets

*FIG. 1*

| KV ID | Key | Value | Set ID's |
|---|---|---|---|
| 0 | Name | Bob | 0 |
| 1 | Name | Bill | 1 |
| 2 | Name | Jill | 2 |
| 3 | Age | 24 | 2 |
| 0 | Name | Bob | 0, 3 |
| 4 | Age | 25 | 3 |
| 5 | Dept | Math | 3 |
| ⋮ | ⋮ | ⋮ | ⋮ |

| Set ID | KV ID |
|---|---|
| 0 | 0 |
| 1 | 1 |
| 2 | 2,3 |
| 3 | 0, 4, 5 |
| ⋮ | ⋮ |

| KV ID | Key | Value | Set ID's |
|---|---|---|---|
| 0 | Name | Bob | 0, 3, 4, 5 |
| ⋮ | ⋮ | ⋮ | ⋮ |
| 5 | Dept | Math | 3, 5 |
| 6 | Age | 26 | 3, 4, 5 |
| 7 | Gender | Male | 5 |
| ⋮ | ⋮ | ⋮ | ⋮ |

| Set ID | KV ID |
|---|---|
| 0 | 0 |
| 1 | 1 |
| 2 | 2,3 |
| 3 | 0, 4, 5 |
| 4 | 0, 6 |
| 5 | 0, 5, 6, 7 |
| ⋮ | ⋮ |

METHODS AND APPARATUS FOR ORGANIZING DATA IN A DATABASE

BACKGROUND

1. Field

The present disclosure generally relates to methods and apparatus for organizing data in a database, and more particularly to organizing storage of sparse data in a database.

2. Background

Relational databases have greatly enhanced the ability to efficiently store and manage structured data. Such databases can manage multiple terabytes of data, for example, and support distributed computing and applications. Most commercial relational databases require users to create data models to represent the relationships that govern the domain from which the data stored is extracted. Data models can be normalized or broken into manageable logical entities based upon relationships observed in the data model. This optimizes performance for applications using the database. In turn, normalization necessitates creation of various tables in the database, with each table containing columns that represent attributes relevant to the domain being modeled. The records in these tables represent observed values for these attributes from the domain. Further, multiple tables can be joined using relationships between the columns and the values stored therein. Structured Query Language (SQL) is the standard computer language used to manage data stored in databases.

The advent of the Internet has created increasing demand for database systems that can model domains where the relationships governing the database may not be known a priori or may change frequently. As an example, an Internet based business might initially store data such as lists of products, prices, and quantity of each product in stock. As the business grows, however, it may be important to know and store other information such as who buys what products, where the purchases originate from, or other relevant information about the transactions. Known relational databases, by design, make it difficult to continuously change the underlying model representing such a business.

A solution to this problem may be to not normalize the data model, but rather store all information in flat databases. A flat database can consist of one large table where the columns represent attributes of interest, and the rows are records of observed values for these attributes. This approach is similar to using a spreadsheet for storing data, something routinely done in small businesses, for example. The resulting flat databases will contain sparse datasets, where most records have observed values for a few key attributes and the values for remaining attributes are left blank.

Accordingly, using relational databases to store sparse data or data, when the underlying model or schema frequently changes frequently works against an optimized database, and requires significant maintenance. A known approach for storage of sparse data involves the use of a column-oriented database system, which has been shown to be a substantial improvement over existing relational databases for storing sparse data. Such database systems, however, still require some modeling of the domain. Accordingly, this requirement can present a limitation when storing data for which the underlying schema changes frequently.

SUMMARY

According to an aspect, a method for organizing data in storage media is disclosed. The method includes linking first data in the storage media to at least one first identifier. Further, the method also includes associating a set having a corresponding second identifier with the at least one first identifier, wherein the set includes at least the first data.

In another aspect, a computer program product is disclosed that includes a computer-readable medium. The computer readable medium includes code for causing a computer to link first data in the storage media to at least one first identifier. Additionally, the medium also includes code for causing a computer to associate at least one identified set with the at least one first identifier, wherein the at least one identified set includes at least the first data.

In yet a further aspect, an apparatus for organizing data in storage media is disclosed. The apparatus includes at least one processor configured to link first data in the storage media to at least one first identifier, and associate at least one identified set with the at least one first identifier, wherein the set includes at least the first data. The apparatus also includes memory coupled to the at least one processor.

DETAILED DESCRIPTION

The presently disclosed methods and apparatus address problems attendant with the storage of sparse data or data where underlying schema changes frequently. In particular, the presently disclosed methods and apparatus provide an improvement to the column store approach, particularly when storing sparse data. The present methods and apparatus afford the ability to automatically store and manage datasets where the schema changes frequently. Briefly, this ability is gained by organizing data in a set-oriented fashion. More specifically, data may be organized through linking a key or type of data and a data value (termed a "key-value" pairing) to a unique identifier, and then further linking the unique identifier to a logical set having its own identifier. Numerous key-value pairings can be linked to a particular set.

As a preface to the detailed discussion of the presently disclosed methods and apparatus, it is noted that all structured data can be grouped into logical sets. Existing data can be updated or deleted from such logical sets, and the logical sets themselves may be grouped arbitrarily to support querying of data. Additionally, logical sets can be augmented to account for underlying data model or schema changes or when new information is gained.

The presently disclosed set-oriented concepts seemingly may have similarity to relational databases, but such similarities are merely limited to the support of operations such as inserting, querying, updating and deleting. The present disclosure affords the ability to augment data sets, which is not directly supported by relational databases or column stores.

It is also noted that a related technology is indexes, such as those used by search engines. Search engine indexes can provide a means to organize and efficiently query documents that contain search terms. The index consists of sets with documents associated to the terms that appear in these documents. New documents can be inserted into the sets related to the terms that appear in these documents. Likewise, documents can be removed from the sets or the sets can be updated when the documents are updated. Indexing related technology may be utilized with the presently disclosed methods and apparatus to support querying of data stored in the logical sets.

It is further noted that the presently disclosed examples may leverage conventional relational databases. However, it should be noted that these are merely examples, and relational database conventions are not a requirement for the practice of the present disclosure. Additionally the system is optimized to store sparse datasets by design, something that is not done well by relational databases as demonstrated with the column store approach.

Figure 1:
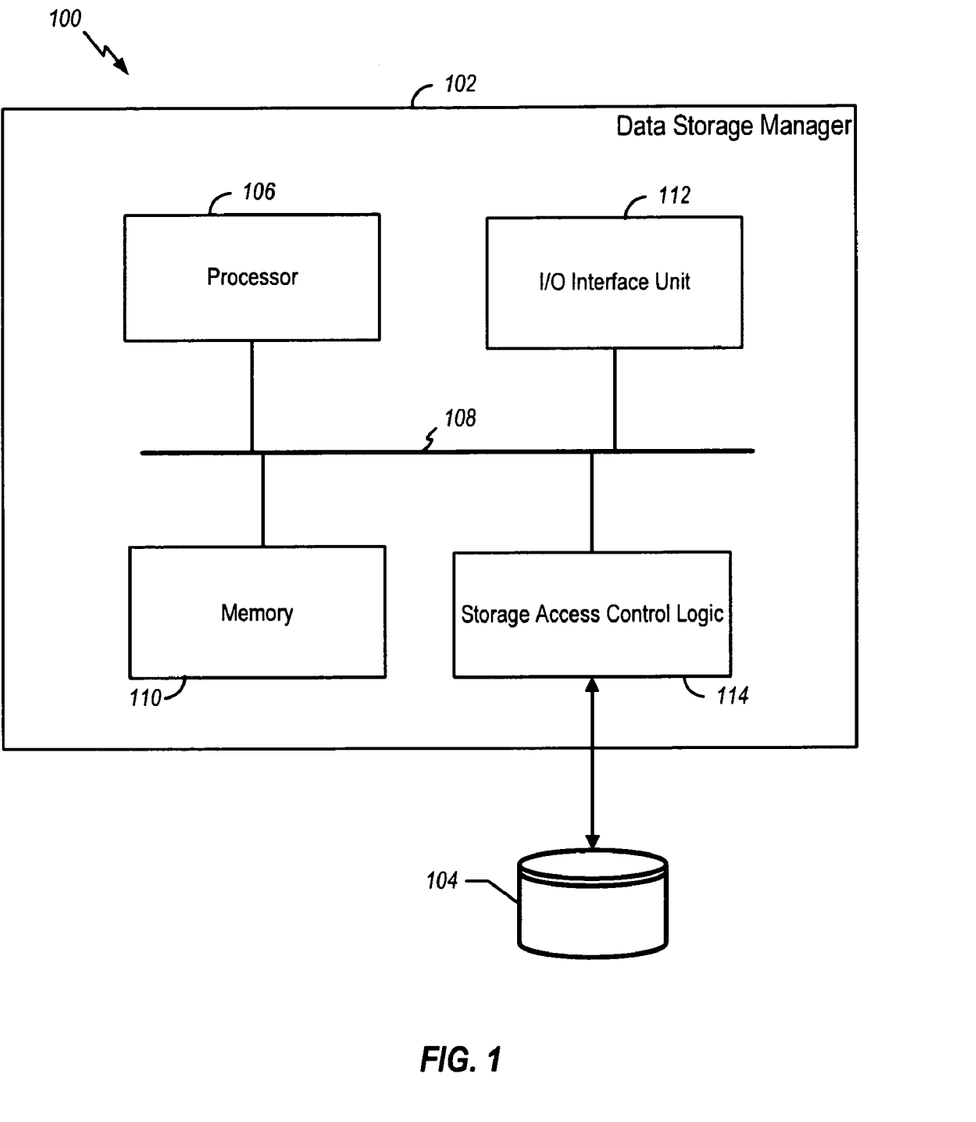
FIG. 1 is a system view of an apparatus used for storing data according to the present disclosure.

FIG. 1 illustrates a system view of an apparatus 100 used for storing data. As illustrated the apparatus 100 includes a data manager 102 configured to store and organize data in storage media, such as data storage 104. The data manager 102 may include a processor 106 that is configured to execute some or all of the operations of data manager 102 in connection with the storage of data. The processor 106 is shown communicatively coupled with a central data bus 108, or similar device for communicatively linking the several modules of the data manager 102 together.

Data manager 102 also includes a memory 110, which may include both read-only memory (ROM) and random access memory (RAM) that provides instructions and data to the processor 106. A portion of the memory 110 may also include non-volatile random access memory (NVRAM), as an example. The processor 106 is configured to perform logical and arithmetic operations based on program instructions stored within memory 110. Moreover, the instructions in memory 110 may be executable to implement the methods described herein.

Additionally, data manager 102 may include an Input/output (I/O) Interface Unit 112, which functions to interface the manager 102 with various input and output devices, such as another processor, computer, network, etc. Data manager 102 also may include a Storage Access Control Logic 114 configured to read and write data from and to data storage 104. Logic 114 may include hardware, software, or firmware or a combination thereof to access the storage 104. In addition, the functions of logic 114 may be effected by software instructions run by processor 106, as an alternative.

The presently disclosed apparatus and methods may utilize two main core logical entities modeled as database tables. The first logical entity is termed a "Key-value" table, which is used to store data with observed values for attributes of relevance to a domain. This entity would include a key or attribute of relevance stored in pairing with an observed value (hereinafter referred to as a key-value pairing). A unique identifier is also associated with each key-value pairing, referred to herein as a key-value ID or "KV ID." Another set-oriented identifier is also stored with each key-value pair and associated with the KV ID. This identifier is termed a "Set ID", and refers to the second logical entity, which is modeled as a table of sets or a "Set table."

The Set table, in particular, contains logical sets used to organize the data stored in the first Key-value table. Specifically, each entry in the Set table may contain the Set ID, which is a unique identifier within this table for a particular set of one or more key-value pairings. Each entry in the Set table also contains one or more KV ID's from the Key-value table for each of the key-value pairings that is within the set. Furthermore, an optional value concerning the type of set may be included as well to afford further categorization or representation of the sets within the Set table.

Figure 2:
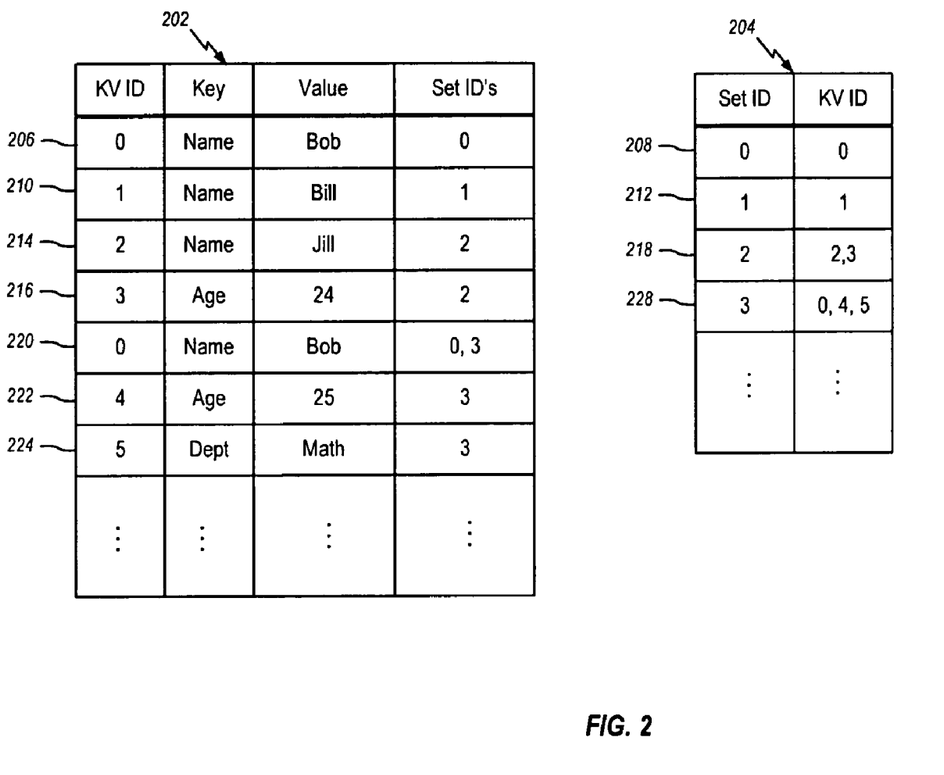
FIG. 2 illustrates an exemplary modeling of logical entities as tables for organizing stored data.

The Key-value and Set tables are used to support the data insert, query, update, delete, augment operations, for example. As an illustration of these logical entities, FIG. 2 illustrates an example of how data is stored and organized in the Key-value and Set tables. As shown, a Key-value table 202 includes columns for the key or type of data, the value of the data corresponding to the key, a key-value ID corresponding to an associated key-value pairing, and one or more Set ID's of the one or more logical sets to which the key-value pairing is associated or linked. Additionally, a logical entity modeled as Set table 204 is included to maintain an accounting of the linking between a set (i.e., Set ID) and one or more key-value ID's corresponding to key-value pairs within the corresponding set.

As noted above, computational operations of inserting, updating, querying, deleting, and augmenting the set-oriented stored data may be fully automated by a data manager, such as manager 102 in FIG. 1, or other similar device. Each of these various operational aspects will be discussed in the following description, and the resultant state changes to the logical entities, namely the Key-value and Set tables.

First concerning insertion of data, the tables 202, 204 of FIG. 2 provide an exemplary illustration of how data is essentially organized according to this aspect. As a first example of a database to organize employee information, it is assumed that an employee having the name "Bob" is inserted into the database. As illustrated by entry 206 in table 202, the key-value pair of the key "Name" and the value "Bob" are stored and assigned a unique KV ID=0. Another entry 208 is made into Set table 204, where a first set having Set ID=0 is created and includes KV ID=0.

A similar key-value entry 210 is illustrated for the same key entity ("Name"), and another value (additional employee "Bill") associated with further KV ID value "1", A corresponding link to Set ID "1" is illustrated by entry 212 in table 204.

Another entry includes an employee Jill who is 24 years old. Accordingly, the key-value pair of Name-Jill is shown in table entry 214 with KV ID=2. Additionally, the KV ID 2 is associated or linked to a set having Set ID=2. The other key-value pair in this entry is "Age-24". Thus, another table entry 216 is made with key "Age" and value "24" associated with another key-value pair with KV ID=3. Since the key-value pairs Name-Jill and Age-24 are related and may logically constitute a set, the Set ID's for each of KV ID's 2 and 3 are linked to a Set ID=2 as shown by entry 218 in table 204, as well as both entries 214 and 216 having a Set ID of 2.

Next, assume further information concerning key-value pair Name-Bob (i.e., KV ID 0) is to be added. For example, the additional information about Bob to be added in this example is his age of 25, and being a member of a Math department. Accordingly, since the key-value pair "Name-Bob" was already entered, as shown by entry 220, which is actually the same as entry 206 except being modified when key-value pairs Age-25 and Dept-Math are inserted to the database. Accordingly, entry 220 is shown as a separate entry to aid clear illustration of how the entry for KV ID=0 changes concerning its linking or association to Set IDs. It is noted here that this method of illustration applies to other entries as well, where there are illustrated multiple entries of a particular KV ID value in the Key-value table, these entries may be thought of a single entry or data field in the database.

Concerning entry 220 then, since the key-value pair Name-Bob was associated with KV ID of "0", the entry for this KV ID will be changed concerning its association with Set IDs. Entry 222 includes the key-value pair "Age-25" and is associated with a KV ID of 4. Furthermore, entry 224 includes the key-value pair "Department-Math." This key-value pairs are then associated with key value identifier 5.

As may be seen in the Set table 204 at entry 228, a set identification for the addition of entries 220, 222, and 224 in table 202 are assigned a Set ID value of 3. The newly added key value identifiers 4 and 5 are linked to this Set ID value. Additionally, the KV ID 0 is also linked to Set ID 3 since the key-value pairs corresponding to KV ID's 4, and 5 related to already entered key-value pair "Name-Bob", which was associated with KV ID 0. As further illustrated in table 202, the entry 220 includes a linking entry of KV ID 0 to Set ID's 0 and 3. It is noted that entry 220 may be logically considered as not a true insertion of data into table 202, but merely the addition of another set (i.e., Set ID) to which the KV ID 0 is to be associated or linked, or, stated another way, the addition of KV ID 0 to the current Set ID.

When the tables 202 and 204 are populated with one or more entries, the database effected thereby may be queried to retrieve the data therein. As an example of a simple query, a data manager, such as manager 102 in FIG. 1, may provide keys for which values are desired or requested. Thus, if the key "Name" is provided for the example of FIG. 2, the result records returned would include the values "Bob", "Bill," and "Jill." In an aspect, the Set ID values may also be returned with the values. Thus, Bob would be returned with Set ID values 0 and 3, Bill with Set ID value 1, and Jill with Set ID value 2. It is noted that query formats are limited to this example, and that those skilled in the art will appreciate that any number of various types of queries are possible and contemplated.

Figure 3:
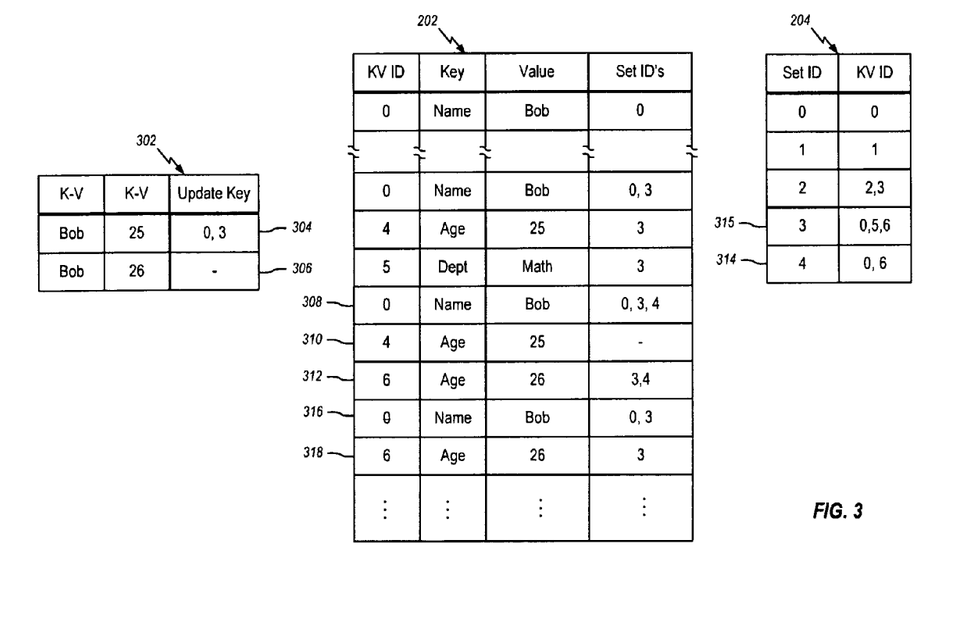
FIG. 3 illustrates an exemplary modeling of logical entities as tables as shown in FIG. 2, with resultant changes for an updating operation.

It is noted that the presently disclosed methods and apparatus also support updating of the logical entities; namely the Key-value and Set tables. Using the example of FIG. 2, FIG. 3 illustrates examples of the further functionality of updating the database. As an example, assume that the age for employee "Bob" needs to be updated from 25 to 26. Accordingly, new key-value pairs are provided, such as by data manager 102, with the Set ID's to which the old values belonged (also termed herein as an "update key"). Thus, in the present example the Set ID's containing the Key-value pairs for "Name-Bob" and "Age-25" are provided, which are Set ID's 0 and 3. Along with this update key, the new key-values "Name-Bob" and "Age-26" are provided as illustrated with an update table 302, which is merely one way to pictorially represent this logical construct. The entry 304 relates to the current stored data, namely the key-value pairs Name-Bob and Age-25. The update key values of Set ID's 0 and 3 are also shown in this row. Table 302 is also shown with the new key-value pair for updating the database. Specifically, entry 306 contains the key-value pairs "Name-Bob" and the "Age-26," which is the new information for updating current key-value pair "Age-25."

As may be also seen in FIG. 3, the resultant changes in the Key-value and Set tables 202 and 204 due to the update of data are illustrated. A first entry 308 is made to table 202 including the key-value pair having KV ID=0 (i.e., "Name-Bob"), which was previously associated with the sets having Set ID's 0 and 3. Another entry 310 illustrates the current key-value pair "Age-25", which was previously associated with KV ID 4 and the set having Set ID=3. A further entry 312 illustrates the new key-value pair "Age-26" that is updating the age information for employee Bob, which is associated with a new KV ID of 6.

As may be seen by entry 314 in Set table 204, a new set is formed with Set ID=4. Since the Key-value "Name-Bob" with KV ID=0 is still valid, the associated or linked Set ID's remain 0 and 3, with additional Set ID 4 also linked to KV ID 0 as may be seen in entry 308 because "Name-Bob" relates to the new key-value "Age-26." Further, the KV ID 4 entry 310 (i.e., Age-25), which previously was associated or linked to the set with Set ID=3, is no longer associated with a set since no employees in the database have age 25. It is noted, however, that if other employees had an age 25 (i.e., KV ID 4) that is associated with other sets, these associations would remain, and merely the association of Bob at age 25 with Set ID 3 would be removed (which may also be seen in the change from entry 228 in the set table shown in FIG. 2 to entry 315 in the updated set table shown in FIG. 3).

Additionally, the newly added KV ID 6 (Age-26) is associated or linked to the newly created set with Set ID=4, as well as Set ID=3 since this set associates the key "Age" and a previous value (i.e., 25) to the set with Set ID=3. Thus, the updated age value 26 is associated with Set ID 3 to ensure that this set has a key-value pair with the key "Age" and the updated value "26" (which also is reflected in the association of Set ID 3 to KV ID 6 in entry 315 of Set table 204).

The Set table 204 shown in FIG. 3 also contains an association or linking of the Set ID 4 to KV IDs 0 and 6 (i.e., key-value pair "Name-Bob" and "Age-26") as shown in entry 314. Also, entries in the Key-value table 202 are linked or associated with appropriate Set ID's. For example, entry 308 illustrates that KV ID 0 is linked to Set ID's 0 and 3, which are previous links, and the new set (Set ID 4). As mentioned above, since the key-value Age-25 linked to KV ID 4 is no longer part of a relevant set, this key-value identification is not longer linked to a set as shown in entry 310. Finally, entry 312 show KV ID 6 (i.e., key-value pair "Age-26") is linked to Set ID's 3 and 4.

Another operation that may be effected in the presently disclosed system includes deletion of data. In order to delete data, as an example, those key-value pairs desired to be deleted are provided with the Set ID's of set to which they are included. As an example, assume that the key-value pairs "Name-Bob" and "Age-26" in the example of FIG. 3 are to be deleted. Accordingly, the key-value pairs "Name-Bob" and "Age-26" are identified along with the Set ID's to which these key-value pairs belong; namely Set ID 4 (See entry 308, 312 in FIG. 3). Because of deletion, changes are then made only to the Key-value table 202. In particular, the association of the KV IDs 0 and 6 corresponding to key-value pairs "Name-Bob" and "Age-26" with Set ID 4 would be removed from Key-value table 202. This is reflected in entries 316 and 318 in FIG. 3. In an aspect, it is noted that data is not deleted from the database, but rather "deletion" effects a modification of how the data is referenced.

Another operation that may be effected is an augmentation of data within the database. That is, additional relational data may be added to the database that was not previously defined at formation of the database. This functionality is particularly beneficial in the context of the presently disclosed databases for storing data where underlying schema is frequently changed. In order to illustrate an example of augmentation, the database of FIGS. 2 and 3 is assumed, excepting the above-described further example of the deletion of key-value pairs "Name-Bob" and "Age-26". Thus, in an example a key "Gender" is desired to be added to the database in relation to particular employee names already defined a priori in the database. If particular male employee names are to be augmented with gender information, key-value pairs "Name-Bob" and "Gender-Male" could be provided. This will result in attendant changes to the Key-Value and Set tables.

Figure 4:
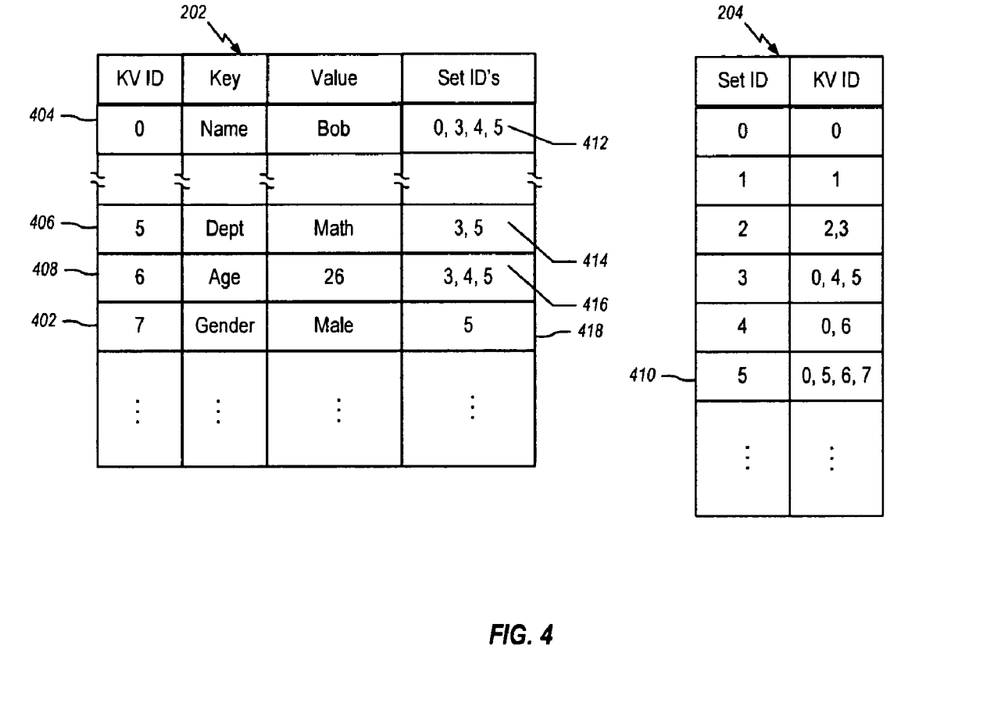
FIG. 4 illustrates an exemplary modeling of logical entities as tables as shown in FIGS. 2 and 3, with resultant changes for an updating operation.

Reference is made to FIG. 4, which provides further illustration of how augmentation affects the Key-value and Set tables. Key-value pair "Gender-Male" is entered into the Key-value table 204 as shown by entry 402 to augment information concerning Name-Bob, as an example. Since "Name-Bob" already is linked to KV ID 0 (See also e.g., entry 308 in FIG. 3), entry 404 again shows this identification. Similarly, the other key-value pairs having ID's 5 and 6, which were previously linked to sets having Name-Bob as a member are also shown by entries 406, 408, as their links to Set IDs are also affected by the augmentation of information.

As may be seen in entry 402, the added key "Gender" and a value (i.e., male) paired with this key are associated with a unique KV ID having a value of 7. Correspondingly, a new augmented set with Set ID 5 shown by entry 410 in Set table 204 is created and linked to KV ID 7. Additionally in this particular example, Set ID 5 is linked to KV IDs 0, 5 and 6 as also shown by entry 410 since the augmented information was initially pertaining to the largest group of key-value pairs Name-Bob (i.e., KV ID=0), Dept Math (i.e., KV ID=5), and Age 26 (i.e., KV ID=6). This affects the Set ID values stored in Key-value table 202 that are linked to KV ID 0, which is now changed to Set IDs 0, 3, 4, and 5 shown by field 412. Similarly, the Set IDs linked to KV IDs 5 and 6 are changed from 3 (See entry 224 in FIG. 2) to 3, 5 in the case of KV ID 5 (See field 414) and from 3, 4 (See entry 312 in FIG. 3) to 3, 4, 5 in the case of KV ID 6 (See field 416). In an aspect, augmentation will always update the set ID subset associated with the submitted key-value pairs having the largest number of key-value pairs matching the submitted group of key-value pairs, which in this example is KV ID=0 having association with Set IDs 0, 3, and 4.

It is noted that if a query were made for Age and Gender following the above-described augment operation, the resultant return would be Age-26, Gender-male, and Set IDs 3, 4 and 5. It is noted that this relationship was not defined at the insertion or creation of the database (i.e., a priori), but rather is created after schema are changed with an attendant augmentation of the data.

Figure 5:
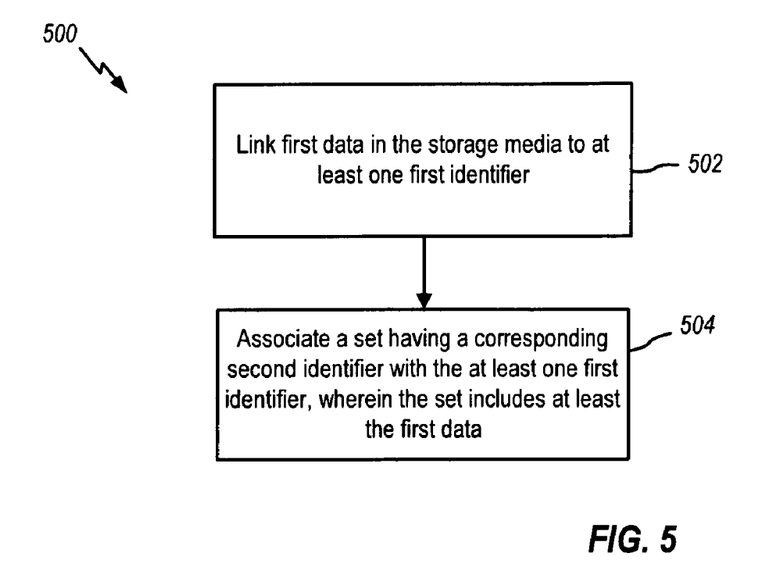
FIG. 5 illustrates an exemplary method for organizing data in a database.

FIG. 5 illustrates an exemplary method 500 for storing and organizing data in accordance with the present disclosure. Method 500 includes block 502 where first data in the storage media is linked to at least one first identifier. It is noted that the term "at least one first identifier" may not just connote a distinct first identifier, but also refers to a first type or class of identifier, such a KV IDs. As an example, the first data may comprise a key-value pair and the at least one first identifier may comprise at least one unique KV ID associated with the key-value pair.

After block 502, block 504 includes associating a set having a corresponding second identifier with the at least one first identifier, wherein the set includes at least the first data. It is noted that the term "second identifier" may not just connote a distinct second identifier, but also refers to type or class of identifier, such a Set IDs. For example, the operation of block 504 may include the second identifier being a Set ID corresponding to a particular set, and assigning the Set ID to one or more KV IDs. It is noted that although the operations of block 502 and 504 are shown in a sequential fashion, one skilled in the art will appreciate that the operations may be performed concomitantly as well. It is further noted that the method 500 may be effected by data manager 102 as illustrated in FIG. 1 or other similar device or functional apparatus.

Figure 6:
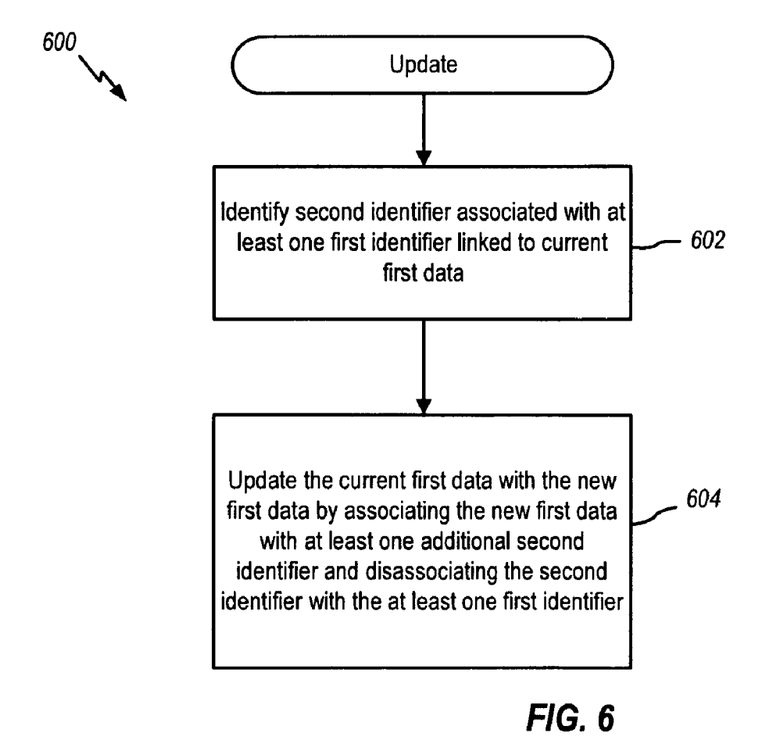
FIG. 6 illustrates an exemplary method for updating data in the presently disclosed database.

FIG. 6 illustrates an exemplary method 600 for updating data in accordance with the present disclosure. More specifically, method 600 is a method for updating currently stored first data (i.e., one or more key-value pairs) within the storage media with new first data (i.e., a new key-value pair replacing the current key-value pair). As illustrated in block 602, a second identifier associated with at least one first identifier linked to the current first data is identified. In a specific aspect, this process in block 602 includes identifying the Set ID associated with the KV ID of a key-value to be updated with new data as discussed above in connection with FIG. 3.

After identification in block 602, the current first data is updated with the new first data by associating the new first data with at least one additional first identifier and second identifier and disassociating at least one identified first identifier with the second identifier as shown in block 604. As an example of this process, the new key-value pair that is updating a current key-value pair is associated with its own unique KV ID. For example, in FIG. 3 the entry 312 linked or associated new data Age-26 with a new KV ID 6 and also linked to new Set ID 4. After this association, the previous KV ID 4 linked to current data Age-25 was then disassociated with Set ID 3.

Figure 7:
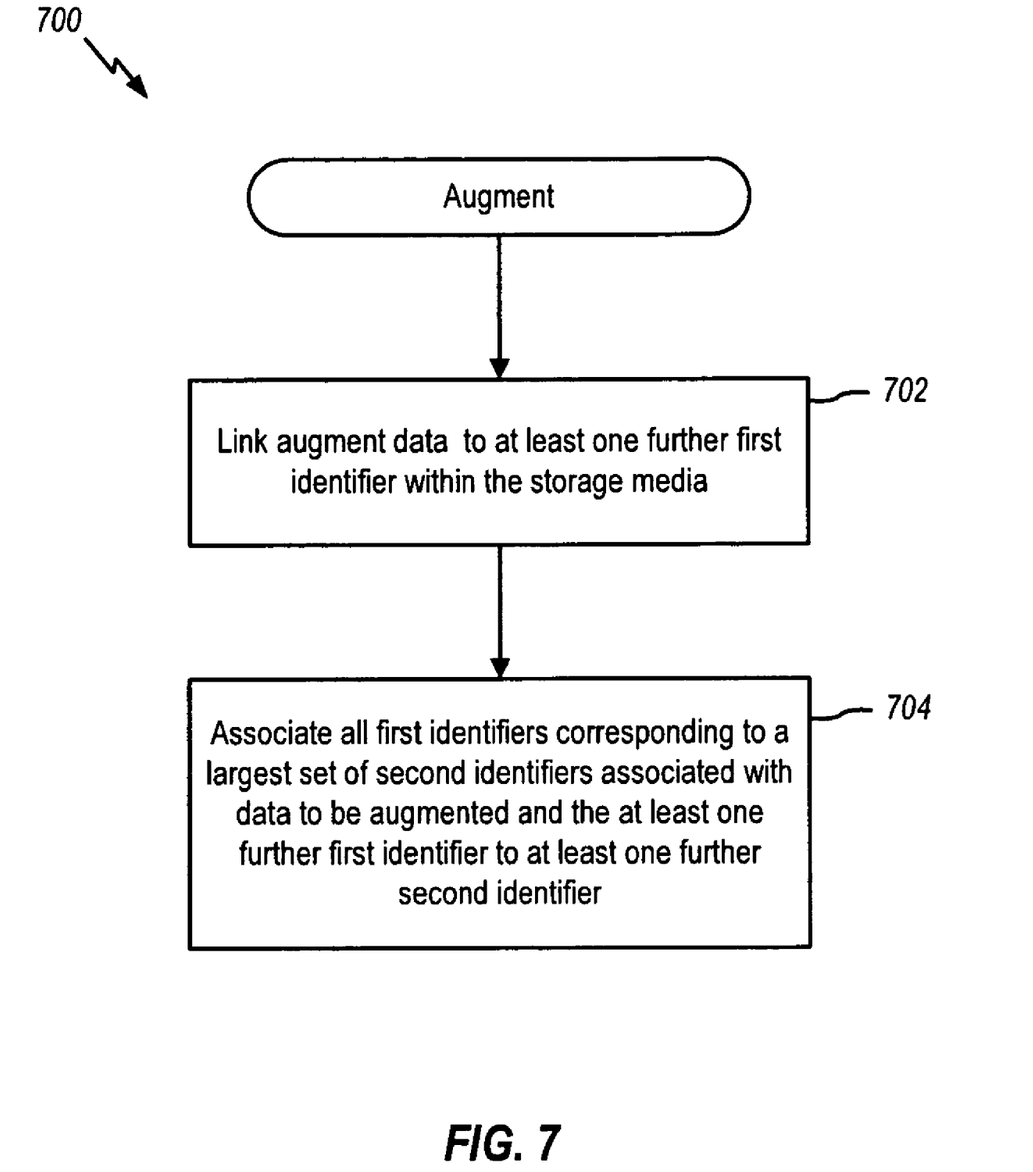
FIG. 7 illustrates an exemplary method for augmenting data in the presently disclosed database.

FIG. 7 illustrates an exemplary method 700 for augmenting data in a database configured in accordance with the present disclosure. When augmentation functionality is initiated, the first process executed is a linking of augment data to at least one further first identifier within the storage media (e.g., the database such as database 104), as shown by block 702. As an example, the augment data may comprise key-value pairs (e.g., key-value pairs such as "Gender-male" augmenting "Name-Bob") and the at least one further first identifier may comprise at least one further unique KV ID associated with the key-value pair (e.g., a KV ID, such as KV ID=7). Thus, the augment data is linked to a first type identifier (i.e., a KV ID).

After the process of block 702, flow proceeds to block 704 where a largest set of all first identifiers associated or matching data to be augmented by the augment data, as well as the at least one further first identifier from block 702 are associated with at least one further second identifier. It is noted that when augment data is presented with existing data to be augmented (e.g., "Gender-male" to augment existing data "Name-Bob"), however, all of the Set IDs or sets to which the augment data is to be associated is unknown. Thus, a largest possible subset of Set IDs having a maximum likelihood of matching is determined. For example, in the example of FIG. 3, the largest possible subset of Set IDs associated with or matching "Name-Bob" is Set IDs 0, 3, and 4 as may be seen in entry 308. As further clarification, it is noted that the KV ID=0 was previously associated with the key-value data "Name-Bob", and is also presented as being associated with the augment data (i.e., "gender-male augmenting "name-Bob"). This KV ID (i.e., first identifier) presents the largest subset of Set IDs (See e.g., entry 308 in FIG. 3 having association with set IDs 0, 3, and 4, which is larger than Age 26 KV ID=6 having only association with Set IDs 3 and 4 as a comparison.

In turn, from this subset of Set IDs 0, 3, and 4 in the set table 204, it may be seen that the largest subset of KV IDs associated with these sets comprises KV IDs 0, 5, and 6. Hence, the largest subset of first identifiers (KV IDs) in the given example is KV IDS 0, 5, and 6.

Further, the process of block 704 then includes associating all of these KV IDs in the determined largest subset with at least one further second identifier (i.e., Set ID, and in the present example Set ID=5) along with the at least one further first identifier (i.e., KV ID, and in this example KV ID=7). Accordingly in the given example of FIGS. 3 and 4, the Set ID=5 (the at least one further second identifier) is associated with KV IDs 0, 5, 6, as well as newly added KV ID 7 (i.e., the at least one further first identifier). It is noted that the at least one further second identifier (e.g., SET ID 5) is at least associated with the at least one further first identifier (KV ID 0) to make a set, wherein the set includes a largest subset of matches of the second identifier; namely a KV ID having a largest subset of Set IDs, wherein the KV ID matches the largest subset of matches of the augment data. As stated above, it is apparent that the augmentation operation will always update the sets with the largest number of key-value pairs matching the submitted group of key-value pairs.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented. It is also noted that the processes illustrated in FIGS. 5-7 may be implemented by data storage manager 102, in general, and more particularly by at least one processor (e.g., processor 106) in combination with a memory storing instructions executable by the at least one processor (e.g., memory 110).

Those skilled in the art will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, means, and steps have been described above generally in terms of their functionality. Whether such functionality is implemented as hardware or software depends upon the particular application and design constraints imposed on the overall system. Those skilled in the art may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor (GPP), an application specific integrated circuit (ASIC) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a GPP and a microprocessor, a plurality of microprocessors, one or more microprocessors in conjunction with a GPP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium (not shown) may be coupled to the processor such the processor can read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The examples described above are merely exemplary and those skilled in the art may now make numerous uses of and departures from, the above-described examples without departing from the inventive concepts disclosed herein. Various modifications to these examples may be readily apparent to those skilled in the art, and the generic principles defined herein may be applied to other examples. Thus, the scope of the disclosure is not intended to be limited to the examples shown herein but is to be accorded the widest scope consistent with the principles and novel features disclosed herein. It is noted that the word "exemplary" is used exclusively herein to mean "serving as an example, instance, or illustration." Any example described herein as "exemplary" is not necessarily to be construed as preferred or advantageous over other examples. Accordingly, the novel aspects described herein are to be defined solely by the scope of the following claims.

What is claimed is:

1. A method for organizing data in storage media, the method comprising:

linking first data in the storage media to at least one first identifier in a first table in the storage media, wherein the first data comprises at least one key-value pair including at least a key entity indicating a type of data and a data value of the type of data that is associated with the key entity, and the at least one first identifier is an identifier associated with a corresponding at least one data pair, and the first table is configured to store a plurality of key-value pairs having key entities with different types of data among the plurality of key-value pairs; and associating a set having a corresponding second identifier with the at least one first identifier, wherein the set includes at least the first data; and augmenting data in the storage media with augment data when such augment data is to be added to data in the storage media, the augmenting including:

linking the augment data to at least one further identifier within the storage media; and associating all first identifiers corresponding to a largest set of second identifiers associated with data to be augmented and the at least one further first identifier to at least one further second identifier.

2. The method as defined in claim 1, wherein each distinct data pair during entry of additional first data in the storage media is linked to a corresponding first identifier.

3. The method as defined in claim 2, wherein at least one corresponding further identified set is associated with one or more first identifiers for each occurrence of entry of additional first data.

4. The method as defined in claim 1, wherein the storage media comprises:

the first table is configured to store at least one row of information comprising the first data, the at least one first identifier, and at least one corresponding second identifier; and a second table configured to store storing at least one row of information comprising the second identifier corresponding to the set and at least one first identifier corresponding to first data included in the set.

5. The method as defined in claim 1, further comprising:

updating the current first data within the storage media with new first data by:

identifying the second identifier associated with at least one first identifier linked to the current first data;

updating the current first data with the new first data; by associating the new first data with at least one additional second identifier and disassociating the second identifier with the at least one first identifier.

6. A computer program product, comprising:

non-transitory computer-readable medium comprising:

code for causing a computer to link first data in the storage media to at least one first identifier in a first table in the storage media, wherein the first data comprises at least one key-value pair including at least a key entity indicating a type of data and a data value of the type of data that is associated with the key entity, and the at least one first identifier is an identifier associated with a corresponding at least one data pair, and the first table is configured to store a plurality of key-value pairs having key entities with different types of data among the plurality of key-value pairs; and code for causing a computer to associate at least one identified set with the at least one first identifier, wherein the at least one identified set includes at least the first data; and code for causing a computer to augment data in the storage media with augment data when such augment data is to be added to data in the storage media, the augment including:

linking the augment data to at least one further identifier within the storage media; and associating all first identifiers corresponding to a largest set of second identifiers associated with data to be augmented and the at least one further first identifier to at least one further second identifier.

7. The computer program product as defined in claim 6, wherein each distinct data pair during entry of additional first data in the storage media is linked to a corresponding first identifier.

8. The computer program product as defined in claim 7, wherein at least one corresponding further identified set is associated with one or more first identifiers for each occurrence of entry of additional first data.

9. The computer program product as defined in claim 6, wherein the storage media comprises:

the first table storing at least one row of information comprising the first data, the at least one first identifier, and at least one corresponding second identifier; and a second table storing at least one row of information comprising the second identifier corresponding to the set and at least one first identifier corresponding to first data included in the set.

10. The computer program product as defined in claim 6, the computer-readable medium further comprising:

code for causing a computer to update the current first data within the storage media with new first data by:

code for causing a computer to identify the second identifier associated with at least one first identifier linked to the current first data;

code for causing a computer to update the current first data with the new first data; by associating the new first data with at least one additional second identifier and disassociating the second identifier with the at least one first identifier.

11. An apparatus for organizing data in storage media, the apparatus comprising:

at least one processor configured to:

link first data in the storage media to at least one first identifier in a first table in the storage media, wherein the first data comprises at least one key-value pair including at least a key entity indicating a type of data and a data value of the type of data that is associated with the key entity, and the at least one first identifier is an identifier associated with a corresponding at least one data pair, and the first table is configured to store a plurality of key-value pairs having key entities with different types of data among the plurality of key-value pairs;

associate at least one identified set with the at least one first identifier, wherein the set includes at least the first data; and augment data in the storage media with augment data when such augment data is to be added to data in the storage media, the augment including:

linking the augment data to at least one further identifier within the storage media; and associating all first identifiers corresponding to a largest set of second identifiers associated with data to be augmented and the at least one further first identifier to at least one further second identifier; and a memory coupled to the at least one processor.

12. The apparatus as defined in claim 11, wherein each distinct data pair during entry of additional first data in the storage media is linked to a corresponding first identifier.

13. The apparatus as defined in claim 12, wherein at least one corresponding further identified set is associated with one or more first identifiers for each occurrence of entry of additional first data.

14. The apparatus as defined in claim 11, wherein the storage media comprises:

the first table configured to store at least one row of information comprising the first data, the at least one first identifier, and at least one corresponding second identifier; and a second table configured to store at least one row of information comprising the second identifier corresponding to the set and at least one first identifier corresponding to first data included in the set.

15. The apparatus as defined in claim 11, wherein the at least one processor is further configured to:

update the current first data within the storage media with new first data by:
- identifying the second identifier associated with at least one first identifier linked to the current first data;
- updating the current first data with the new first data; by associating the new first data with at least one additional second identifier and disassociating the second identifier with the at least one first identifier.

* * * * *